(12) United States Patent
Anderson et al.

(10) Patent No.: US 6,208,470 B1
(45) Date of Patent: Mar. 27, 2001

(54) TELECENTRIC PROJECTION LENS

(75) Inventors: Douglas W. Anderson, Richardson; D. Scott Dewald, Dallas, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/339,332

(22) Filed: Jun. 23, 1999

Related U.S. Application Data

(60) Provisional application No. 60/090,325, filed on Jun. 23, 1998.

(51) Int. Cl.[7] .............................. G02B 3/00; G02B 9/00; G02B 13/22
(52) U.S. Cl. ............................................ 359/649; 359/663
(58) Field of Search ..................... 359/649–651, 359/663, 648, 749–753

(56) References Cited

U.S. PATENT DOCUMENTS

| | | | |
|---|---|---|---|
| 5,625,495 | * 4/1997 | Moskovich | 359/663 |
| 5,914,818 | 6/1999 | Tejada et al. | 359/663 |
| 5,949,589 | * 9/1999 | Nakazawa | 359/753 |

* cited by examiner

*Primary Examiner*—Georgia Epps
*Assistant Examiner*—Jordan M. Schwartz
(74) *Attorney, Agent, or Firm*—Charles A. Brill; Wade James Brady, III; Frederick J. Telecky, Jr.

(57) ABSTRACT

A projection lens (400) having a BFD:EFL, ratio in the range of 0.80:1 to 1.60:1, an air equivalent BFD of at least 4.3 inches, a throw ratio in the range of 3:1 to 6:1, and lateral color correction of one-quarter pixel when used with an SXGA modulator having pixels on 0.17 $\mu$m centers, and operating with its chief rays telecentric at the plane of the modulator. The projection lens comprises an objective lens group (402), a telecentric lens group (404), and an aperture stop (414) between the objective lens group and the telecentric lens group.

5 Claims, 3 Drawing Sheets

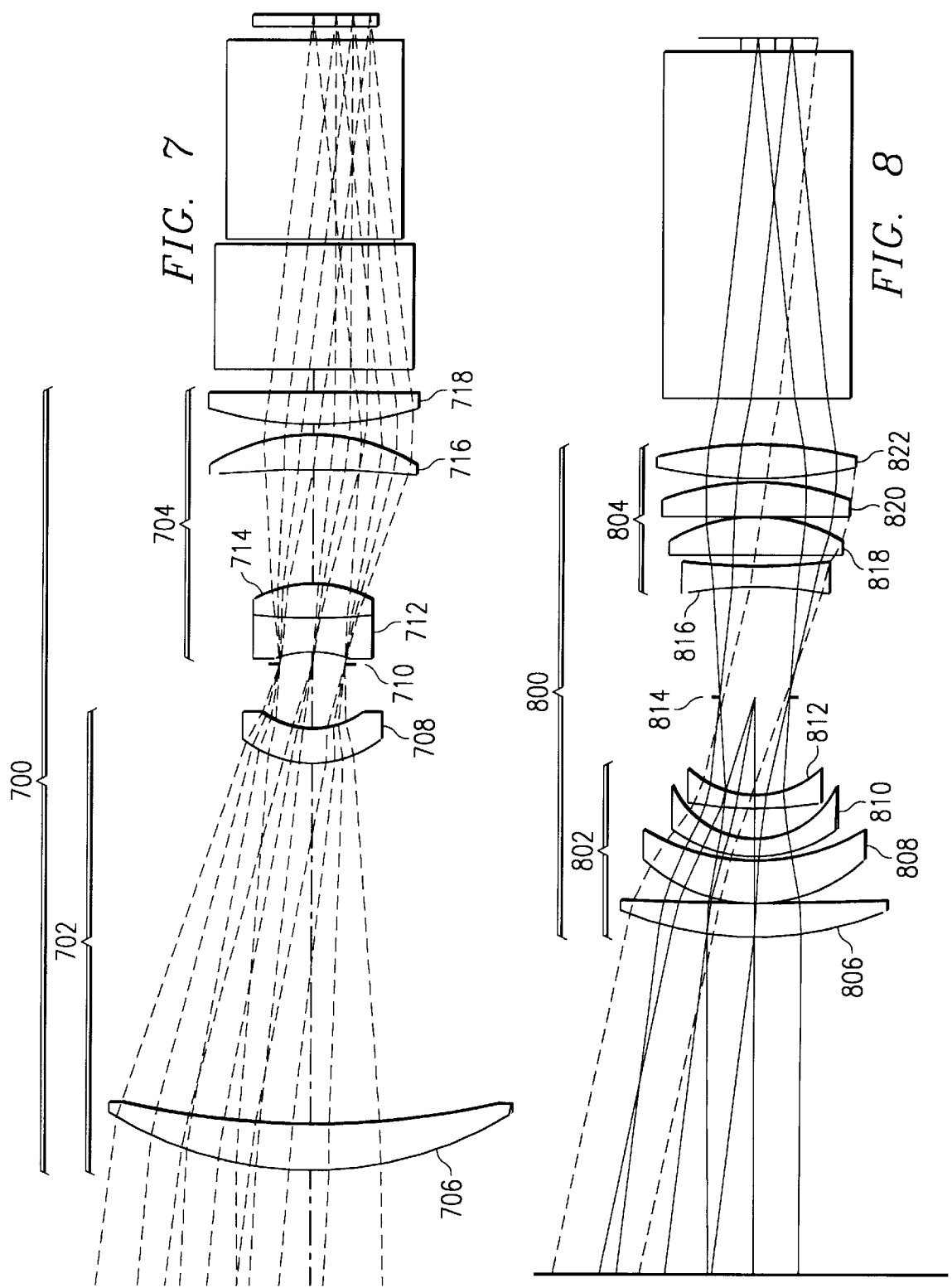

TELECENTRIC PROJECTION LENS

This application claims priority under 35 USC §119(e)(1) of provisional application number 60/090,325 filed Jun. 23, 1998.

CROSS-REFERENCE TO RELATED APPLICATIONS

The following patents and/or commonly assigned patent applications are hereby incorporated herein by reference:

| U.S. Pat. No. | Filing Date | Issue Date | Title |
| --- | --- | --- | --- |
| 5,914,818 | Nov. 18, 1977 | June 22, 1999 | Offset Projection Lens For Use With Reflective Spatial Light Modulators |

FIELD OF THE INVENTION

This invention relates to the field of projection optical systems, particularly to projection optical systems using reflective spatial light modulators, and more particularly to projection lenses for use with a digital micromirror device (DMD).

BACKGROUND OF THE INVENTION

Projection optical systems present many optical design challenges, several of which require a tradeoff between conflicting design goals. Foremost is the requirement of producing a high-quality image, characterized by low distortion, high resolution, high contrast ratio, high light throughput, and uniform screen illumination. In addition to the image quality requirement, the operational environment for many optical projectors introduces further constraints. For example, many projectors must project images large enough to be seen by many people, yet fit into a rather small conference room. This constraint requires the projection system to have a relatively wide field angle so that a large image may be produced with a short projection distance. Other lenses, such as those described herein which are used in large venue applications, do not require the wide field angles, but instead require excellent lateral color correction.

Additionally, the projection systems are rarely positioned level with the center of the projection screen. Because the projector system and the center of the screen are not located at the same elevation, the image may exhibit a keystoning effect. Keystoning occurs when an image is projected at an angle onto a screen causing the side of the image furthest from the projector to be wider than the side of the image closest to the projector. Keystoning often occurs when a table-top overhead projector projects an image upward onto a wall screen. Because the top of a projected square object will be wider than the bottom, the object will resemble the wedge-shaped piece at the crown of a stone archway called a keystone. Wide field angles exacerbate the problem of keystoning.

Existing lenses that have wide field angles, low distortion, high resolution, high contrast ratio, high light throughput, and uniform screen illumination are either too small format, have too short of a back focal distance, or have insufficient lateral color correction. Therefore, there is a need in the art for a high resolution projection lens having a long back focal distance, a wide field angle, high contrast ratio, low distortion, high light throughput, and uniform screen illumination.

SUMMARY OF THE INVENTION

Objects and advantages will be obvious, and will in part appear hereinafter and will be accomplished by the present invention which provides a telecentric projection lens. One embodiment of the claimed invention provides a projection lens having a BFD:EFL ratio in the range of 0.80:1 to 1.60:1, an air equivalent BFD of at least 4.3 inches, a throw ratio in the range of 3:1 to 6:1, and lateral color correction of one-quarter pixel when used with an SXGA modulator having pixels on 0.17 μm centers, and operating with its chief rays telecentric at the plane of the modulator. The projection lens comprises an objective lens group, a telecentric lens group, and an aperture stop between the objective lens group and the telecentric lens group.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 is a schematic view of a projection lens assembly according to a third embodiment of the present invention, shown in conjunction with an illumination prism assembly and a color splitting prism assembly.

FIG. 8 is a schematic view of a projection lens assembly according to a fourth embodiment of the present invention, shown in conjunction with an illumination prism assembly and a color splitting prism assembly.

DETAILED DESCRIPTION OF THE PREFERRED EMBODIMENTS

Figure 1:
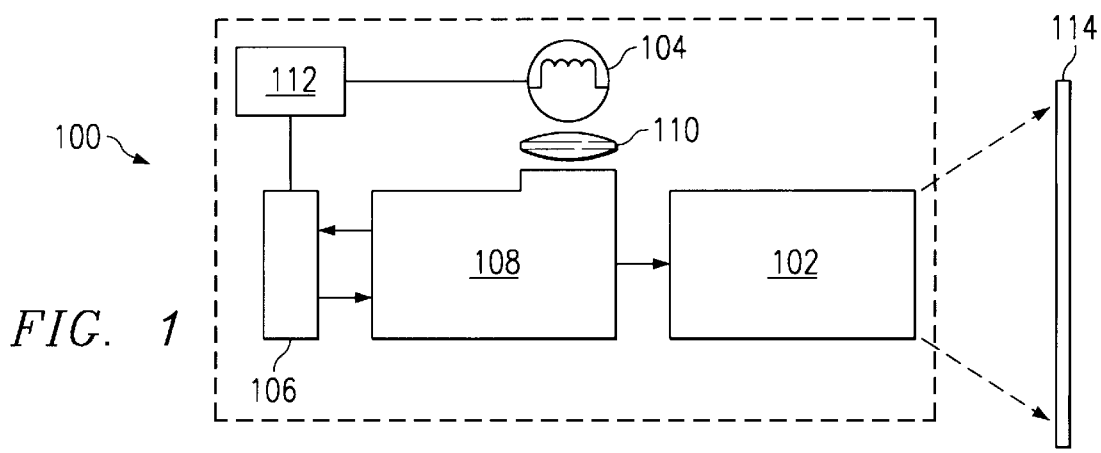
FIG. 1 is a block diagram of a projection display system showing a projection lens according to one embodiment of the present invention in conjunction with a prism assembly.

A schematic diagram of an image projection system 100 using a projection lens 102 according to the present invention is shown in FIG. 1. In FIG. 1, a light source 104, typically an xenon lamp, generates a beam of light which is focused onto a spatial light modulator (SLM) via a combination of prisms 108 and lenses 110. For simplicity, the lens and prisms are represented in FIG. 1 by a single lens 110 and a single prism 108, but it is understood that the lens 110 and prism 108 of FIG. 1 may represent multiple configurations of lenses and prisms.

Lens 110 focuses light from source 104 onto the SLM 106, and the SLM 106 modulates the light as directed by controller 112. The modulated light beam passes though prism assembly 108 and is focused onto projection screen 114 by projection lens 102.

The prism assembly of FIG. 1 performs multiple functions depending on the type of projection system 100 in which it is used. First, the prism assembly 108 performs an illumination function by directing the light beam from the light source onto the SLM. The prism assembly also spatially separates the light beam shining on the SLM from the light beam reflected by the SLM. The illumination function is especially important in displays systems in which the SLM is a DMD because the typical DMD element operates by tilting a mirror element only +/−10° creating a mere 20° separation between the incident and reflected light beams.

Figure 2:
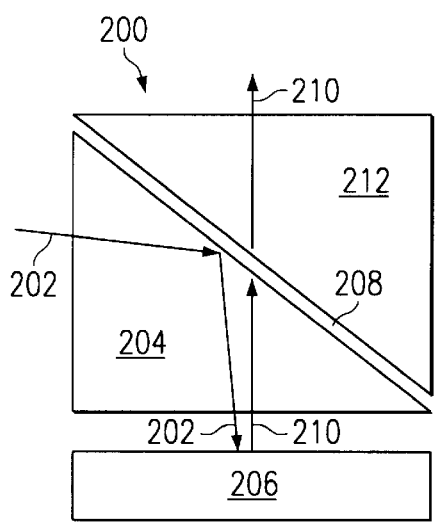
FIG. 2 is a side view of an illumination prism assembly which forms a portion of the prism assembly of FIG. 1.

FIG. 2 shows a side view of an illumination prism assembly 200, according to the prior art, for deflecting a light beam 202. The incident light beam 202 is totally internally reflected from the interface between a first prism 204 and an air gap 208. The reflected incident light beam 202 strikes the DMD 206 and is reflected by the DMD 206. If the mirrors of the DMD 206 in FIG. 2 are rotated counter-clockwise by an angle equal to half the angle of the incident light beam, the reflected light beam 210 will be normal to the surface of the DMD array. Therefore, for a 10° rotation of the DMD mirrors, the incident and reflected light beams diverge by 20°. By properly selecting the material and dimensions of the first prism 204, the reflected light beam 210 will not be reflected at the interface between the first prism 204 and the air gap 208, but will pass through the air gap 208 and compensation prism 212. As a result of the selective reflection of the incident 202 and reflected 210 beams approximately 90°, enough to prevent interference between the light source 104 and the projection lens 102 shown in FIG. 1.

Figure 3:
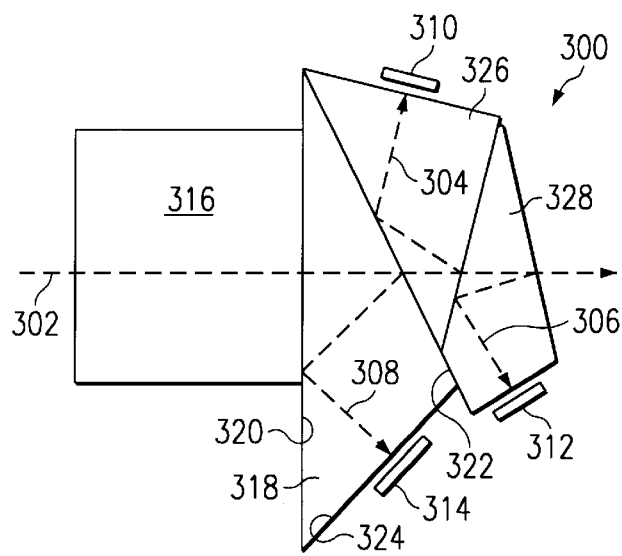
FIG. 3 is a side view of a color splitting prism assembly which forms a portion of the prism assembly of FIG. 1.

Another purpose of the prism assembly 108 of FIG. 1 is to act as a color splitter/combiner so that a single light source can be used to generate a full-color image. FIG. 3 shows one embodiment of a color splitting prism assembly 300, according to the prior art. Color splitting prism 300 splits a white-light beam into three component chromatic light beams 304, 306, 308, and recombines the three component light beams 304, 306, 308, after they are reflected by a spatial light modulator 310, 312, 314. In FIG. 3, light beam 302 enters the color splitting prism assembly 300 through a coupling prism 316. According to some embodiments, coupling prism 316 may be the illumination prism assembly 200 of FIG. 2. The light beam 302 passes through the coupling prism 316 and enters the first splitting prism 318 through a first face 320 and passes through the first splitting prism 318 to a second face 322.

The second face 322 of the first splitting prism 318 reflects a first component light beam 308 while allowing the remainder of light beam 302 to exit the first splitting prism 318. Typically, a dichroic color filter is deposited on the second face 322 of the first splitting prism 318 to cause the first component light beam 308 to reflect. The second face 322 of the first splitting prism 318 reflects the first color component light beam 308 at an angle sufficient to cause a total internal reflection of the first color component light beam 308 at the first 320 of the first splitting prism 318. The first color component light beam 308 then exits the first splitting prism 318 through the third face 324 where it is selectively reflected spatial light modulator 314.

After being modulated and reflected by the spatial light modulator 314, the first color component light beam retraces its path through the first splitting prism 318 and the coupling prism 316 before being separated from the incident light beam 302 by an illumination prism. Two additional color component light beams 304, 306, are separated from the light beam 302 by a second and third splitting prism 326, 328 and modulated by two additional spatial light modulators 310, 312. Portions of light beam 302 that are not reflected by the three splitting prism assembly 300.

Figure 4:
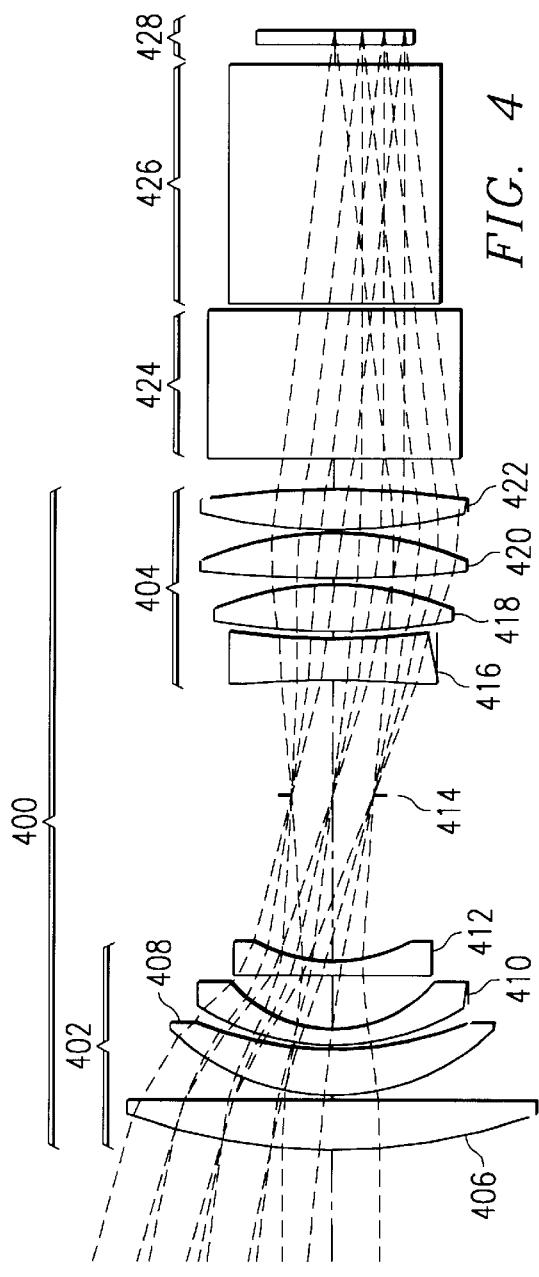
FIG. 4 is a schematic view of a projection lens assembly according to a first embodiment of the present invention, shown in conjunction with an illumination prism assembly and a color splitting prism assembly.

FIG. 4 is a schematic diagram of a projection lens 400 according to a first embodiment of the present invention. Projection lens 400 has excellent lateral color correction and high light throughput with low distortion, and projects a high resolution image with low intensity ghosts reflections, while providing uniform screen illumination. The projection lens 400 also has a long back focal distance and is telecentric in object space, thereby enabling the use of projection lens 400 with a reflective light modulator 428 and a large prism assembly. In FIG. 4, the prism assembly includes both an illumination prism assembly 424, and a color splitting prism assembly 426. As discussed above, the illumination prism assembly separates the incident and reflected beams of light while the color splitting prism assembly separates the incident beam into three chromatic beams of light and recombines the three chromatic beams of light after they are modulated. The projection lens 400 will function without either or both of the separate prism sub-assemblies, but the embodiment detailed in Table 1 compensates for the aberrations induced by the prisms.

The use of illumination prism assembly 424 requires the lens to operate with the chief rays telecentric at the SLM in order to maximize the light throughput without compromising the action of the TIR prism. The use of either prism assembly requires the lens to have a long back focal distance. Because projection lenses can be used in a variety of circumstances, a range of focal lengths is needed. In particular, projection lenses to provide throw ratios in the range 3.0:1 to 6.0:1, where throw ratio is defined as the ratio of projection distance to screen width, would cover most requirements. Moreover, the DMD format presently used for large venue projection systems, SXGA, has a nominal array of 1280×1024 pixels and a diagonal dimension of about 1.1 inches. In order to accommodate an offset of one-half the vertical array height, these lenses must be designed for a minimum full width at the DMD of 1.35 inches for SXGA formats.

The SXGA format demands a prism assembly that represents an air equivalent BFD of 4.3 inches. This unique set of requirements has led to a family of unique projection lens designs. To achieve the throw ratio requirements of 3:1 to 6:1, the fields-of-view of the lenses are between 14 and 28 degrees. For SXGA, the ratio of BFD to effective focal length (EFL) falls in the range of 0.80 to 1.60. The family of projection lens designs resulting from these requirements all are of the reverse telephoto type, are telecentric at the DMD, have low distortion and high contrast, have long back focal distances relative to their effective focal lengths, and have lateral color correction of one-quarter pixel height or better.

Projection lens 400 shown in FIG. 4 has a throw ratio of 3.0:1. It is designed for the SXGA format, and has an air equivalent back focal distance of 4.5 inches. The overall length from the front vertex of the first lens to the rear vertex of the last lens is less than 145 mm.

Projection lens 400 includes two groups of lens elements 402, 404 separated by an aperture stop 412. The first group of lens elements is called the objective lens group 402 and, according to the embodiment shown in FIG. 4, is composed of four lens elements. The second lens group 404 is a telecentric lens group. A telecentric lens focuses the image of the aperture at infinity.

In addition to the objective lens group 402, the telecentric lens group 404, the illumination prism assembly, the color splitting prism assembly, and the reflective spatial light modulator, FIG. 4 also shows a glass window over the reflective light modulator. The window is typically a part of the reflective spatial light modulator package. For example, DMD spatial light modulators are hermetically sealed in a ceramic integrated circuit package with a window on the top of the package to allow light to enter and leave the package.

The illumination prism assembly, the color splitting prism assembly, and the window, are the optical equivalent to a 37.500 mm thick, piece of BK7 Schott glass, a 60.500 mm thick piece of BK7 Schott glass, and a 3.000 mm thick piece of ZKN7 Schott glass respectively. Additionally, there is a 8.000 mm air gap between the projection lens and the illumination prism assembly, a 1.000 mm air gap between the illumination prism assembly 404 and the color splitting prism assembly, a 4.000 mm air gap between the color splitting prism assembly and the window, and a 0.5 mm air gap between the window and the spatial light modulator.

The first embodiment of the disclosed projection lens shown in FIG. 4, uses all spherical lenses and is detailed in Table 1. The objective lens group 402 includes four lenses. The front lens 406 in the objective group 402 is a positive lens. For the purposes of this disclosure, the "front" of the lens is toward the objective end or projection end and opposite the spatial light modulator end, or back end. Furthermore, the curvature of the surface or radius, is positive if the center of curvature is on the modulator, or back, side of the lens. Therefore, a front surface of a lens is convex if it has a positive radius and concave if it has a negative radius, while the back surface of a lens is convex if it has a negative radius and concave if it has a positive radius. Additionally, the spacing between one lens and the next lens is measured from the rear vertex of the first lens to the front vertex of the next lens.

The second lens 408 in the objective group 402 is a positive lens. The third lens 410 in the objective group 402 is a negative lens. The fourth lens 412 in the objective group 402 is a negative lens. The objective lens group 402 is located 43.147 mm in front of the aperture stop 414.

The telecentric lens group 404 also includes four lenses. The first lens 416 in the telecentric group 404 is a negative lens. The second lens 418 in the telecentric group 404 is a positive lens. The third lens 420 in the telecentric group 402 is a positive lens. The fourth lens 422 in the telecentric group 402 is a positive lens. The overall length of the projection lens assembly 400 of the preceding embodiment is 147.279 mm from the front surface of the first lens 406 of the objective group 402 to the rear surface of the fourth lens 422 of the telecentric group 404.

The dimensions of each lens in the embodiment described above are listed in Table 1 below.

TABLE 1

| Object | Front Radius of Curvature | Rear Radius of Curvature | Thickness | Diameter | Material |
|---|---|---|---|---|---|
| Lens 406 | 110.491 | 845.293 | 12.450 | | LAC10 |
| Air Gap | | | 1.000 | | |
| Lens 408 | 48.538 | 71.648 | 11.402 | | NBFD15 |
| Air Gap | | | 1.000 | | |
| Lens 410 | 47.380 | 27.876 | 4.000 | | FCD1 |
| Air Gap | | | 13.043 | | |
| Lens 412 | 307.680 | 30.541 | 3.000 | | FC10 |
| Air Gap | | | 43.147 | | |
| Stop 414 | | | | | |
| Air Gap | | | 10.000 | | |
| Lens 416 | −226.185 | 122.352 | 2.326 | | NBFD10 |
| Air Gap | | | 11.391 | | |
| Lens 418 | 154.647 | −64.913 | 1.000 | | FCD1 |

TABLE 1-continued

| Object | Front Radius of Curvature | Rear Radius of Curvature | Thickness | Diameter | Material |
|---|---|---|---|---|---|
| Air Gap | | | 11.410 | | |
| Lens 420 | 227.134 | −79.832 | 1.000 | | FCD1 |
| Air Gap | | | 10.110 | | |
| Lens 422 | 105.135 | −251.613 | 8.000 | | FCD1 |

The projection lens assembly 400 is suitable for projecting an image from an SXGA format DMD or other SLM 402. SXGA format devices have 1024 rows of pixels, with 1280 pixels in each row. The field of view at the SLM is approximately 1.35 inches diagonally. The large field of view allows about a 50% offset in the vertical field of view which helps to reduce keystoning when the projector is used to project onto a screen that is not centered on the axis of projection.

Figure 5:
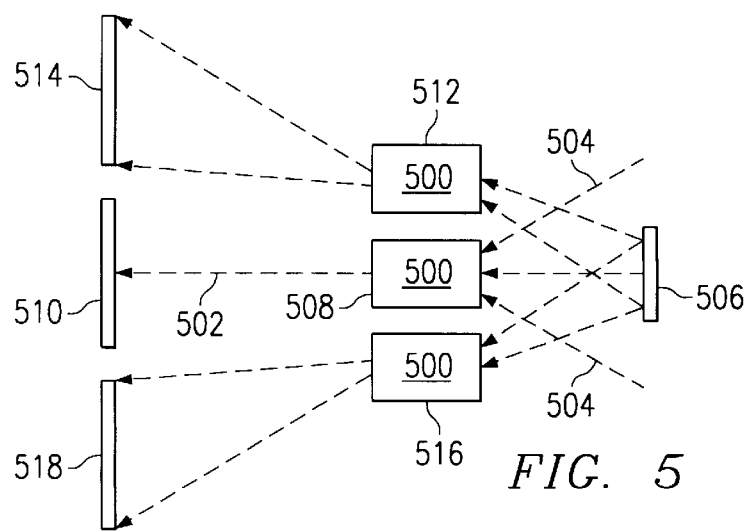
FIG. 5 is a schematic view of the projection lens assembly of FIG. 4 showing the benefits of offset projection.

FIG. 5 is a simplified pictorial representation of the operation of offset projection lens systems having greatly exaggerated offset angles. Offset projection occurs when the format of the projection lens 500, or the maximum object the projection lens 500 is capable of imaging, is larger than the actual object being imaged and the object being imaged is not located on the lens axis 502. For example, projection lens 500 has a field of view, as shown by rays 504 that, at the plane of the modulator 506 is much larger than the object being imaged. When the projection lens 500 is in position 508, the image of modulator 506 is projected by the projection lens 500 onto the image plane at location 510. If the projection lens 500 is moved upward in relation to modulator 506 to position 512, the image of the modulator 506 is shifted, or offset, across the image plane to location 514. Likewise, if the projection lens 500 is moved downward in relation to modulator 506 to position 516, the image of the modulator 506 is shifted, or offset, across the image plane to location 518.

Offset projection can be used to prevent image keystoning when the projector is not at the same elevation as the center of the projection screen. For example, when an on-axis projection system is mounted to a conference room ceiling and projects downward to the center of a wall mounted projection screen, the bottom of the image is wider than the top. If an offset projection lens 500 is used, however, the projection lens 500 is shifted down relative to the modulator 506 causing the image to be shifted down while retaining the correct image dimensions. Likewise, if the projection lens 500 is shifted upward relative to the modulator 506, the image of the modulator projected upward, allowing a tabletop projector to project an image upward onto a wall mounted screen without keystoning. In FIG. 5, the field of view shown by rays 504 is approximately four times as large.

Figure 6:
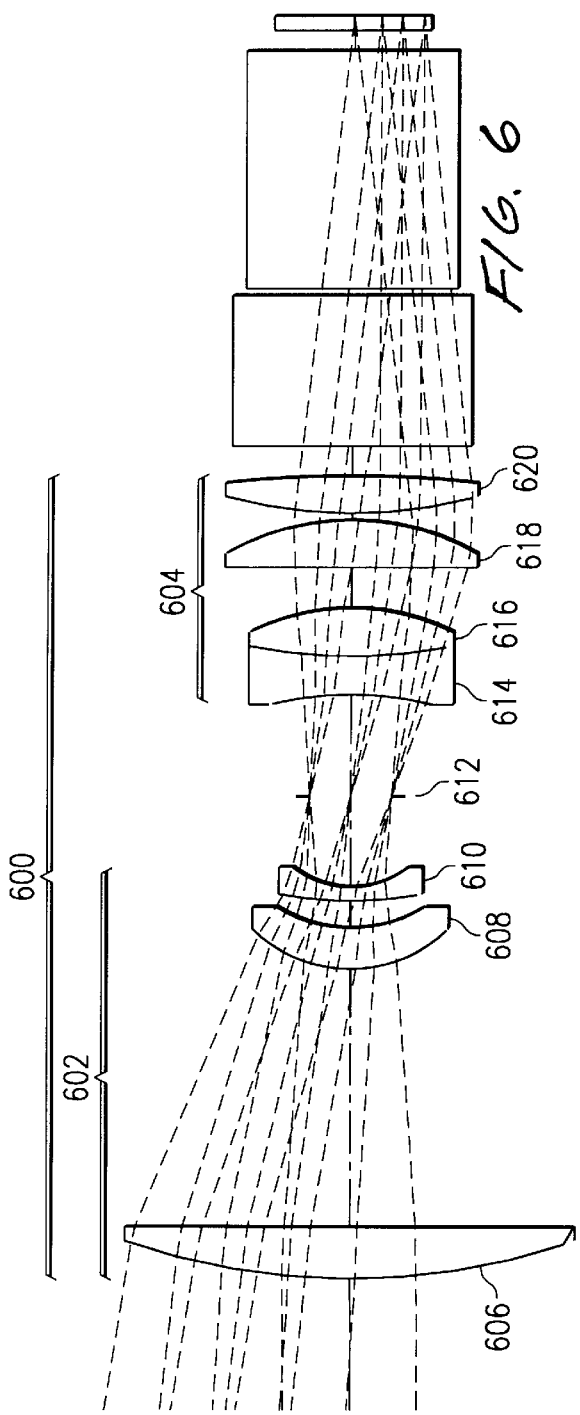
FIG. 6 is a schematic view of a projection lens assembly according to a second embodiment of the present invention, shown in conjunction with an illumination prism assembly and a color splitting prism assembly.

A second embodiment, shown as projection lens 600 in FIG. 6, also uses only spherical lenses. The front lens 606 in the objective lens group 602 is a positive lens. The second lens 608 in the objective group is a positive lens. The third lens 610 in the objective group is a negative lens. The objective lens group 602 is located 23.337 mm in front of the aperture stop 612.

The telecentric lens group 604 includes four lenses. The first lens 614 in the telecentric lens group 604 is a negative lens. The second lens 616 in the telecentric lens group is a positive lens and is cemented to the first lens 614 to form a cemented doublet. The cemented doublet helps to correct chromatic aberrations in the projection lens assembly 600.

The third lens 618 in the telecentric lens group is a positive lens. The fourth lens 620 in the telecentric lens group is a positive lens. The overall length of the projection lens assembly 600 of this embodiment is approximately 197.282 mm from the front surface of the first lens 606 of the objective group 602 to the rear surface of the last lens 620 of the telecentric group 604.

Projection lens assembly 600, as described above and detailed in Table 2, has a throw ratio of 4.5:1 and is designed to operate with SXGA (1280×1020 on 17 μm centers) micromirror systems with ample vertical offset.

TABLE 2

| Object | Front Radius of Curvature | Rear Radius of Curvature | Thickness | Diameter | Material |
|---|---|---|---|---|---|
| Lens 606 | 158.388 | 1093.631 | 12.278 | | TAF1 |
| Air Gap | | | 63.267 | | |
| Lens 608 | 33.287 | 33.432 | 10.000 | | TAF1 |
| Air Gap | | | 6.932 | | |
| Lens 610 | 103.123 | 24.705 | 3.000 | | FD5 |
| Air Gap | | | 23.337 | | |
| Stop 612 | | | | | |
| Air Gap | | | 24.611 | | |
| Lens 614 | −96.554 | 112.023 | 10.000 | | NBFD13 |
| Lens 616 | 112.023 | −59.490 | 11.706 | | BACD16 |
| Air Gap | | | 9.596 | | |
| Lens 618 | 989.074 | −62.596 | 12.118 | | FCD1 |
| Air Gap | | | 1.000 | | |
| Lens 620 | 110.972 | −372.133 | 9.438 | | FCD1 |

A third embodiment, shown as projection lens 700 in FIG. 7, also uses only spherical lenses. The front lens 706 in the objective lens group 702 is a positive lens. The second lens 708 in the objective group is a positive lens. The objective lens group 702 is located 23.337 mm in front of the aperture stop 710.

The telecentric lens group 704 includes four lenses. The first lens 712 in the telecentric lens group 704 is a negative lens. The second lens 714 in the telecentric lens group is a positive lens and is cemented to the first lens 712 to form a cemented doublet. The cemented doublet helps to correct chromatic aberrations in the projection lens assembly 700. The third lens 716 in the telecentric lens group is a positive lens. The fourth lens 718 in the telecentric lens group is a positive lens. The overall length of the projection lens assembly 700 of this embodiment is approximately 230.852 mm from the front surface of the first lens 706 of the objective group 702 to the rear surface of the last lens 718 of the telecentric group 704.

Projection lens assembly 700, as described above and detailed in Table 3, has a throw ratio of 6.0:1 and is designed to operate with SXGA (1280×1020 on 17 μm centers) micromirror systems with ample vertical offset.

TABLE 3

| Object | Front Radius of Curvature | Rear Radius of Curvature | Thickness | Diameter | Material |
|---|---|---|---|---|---|
| Lens 706 | 106.500 | 252.252 | 15.282 | | SK5 |
| Air Gap | | | 104.635 | | |
| Lens 708 | 30.112 | 22.616 | 10.000 | | SF6 |
| Air Gap | | | 20.013 | | |
| Stop 710 | | | | | |
| Air Gap | | | 3.575 | | |
| Lens 712 | −36.390 | 92.669 | 10.000 | | SF4 |
| Lens 714 | 92.669 | −40.774 | 10.000 | | FK5 |
| Air Gap | | | 34.701 | | |
| Lens 716 | −239.237 | −59.359 | 10.230 | | LAK9 |

TABLE 3-continued

| Object | Front Radius of Curvature | Rear Radius of Curvature | Thickness | Diameter | Material |
|---|---|---|---|---|---|
| Air Gap | | | 3.336 | | |
| Lens 718 | 103.940 | 787.844 | 9.080 | | LAF2 |

A fourth embodiment, shown as projection lens 800 in FIG. 8, also uses only spherical lenses. The front lens 806 in the objective lens group 802 is a positive lens. The second lens 808 in the objective group is a positive lens. The third lens 810 in the objective group is a negative lens. The fourth lens 812 in the objective group is a negative lens. The objective lens group 802 is located 29.79579 mm in front of the aperture stop 814.

The telecentric lens group 804 includes four lenses. The first lens 816 in the telecentric lens group 804 is a negative lens. The second lens 818 in the telecentric lens group is a positive lens. The third lens 820 in the telecentric lens group is a positive lens. The fourth lens 822 in the telecentric lens group is a positive lens. The overall length of the projection lens assembly 800 of this embodiment is approximately 366.417 mm from the front surface of the first lens 806 of the objective group 802 to the rear surface of the last lens 822 of the telecentric group 804.

Projection lens assembly 800, as described above and detailed in Table 4, has a throw ratio of 3.9:1 and is designed to operate with SXGA (1280×1020 on 17 μm centers) micromirror systems with ample vertical offset.

TABLE 4

| Object | Front Radius of Curvature | Rear Radius of Curvature | Thickness | Diameter | Material |
|---|---|---|---|---|---|
| Lens 806 | 103.1581 | 533.228 | 9.50 | 80 | LAF71M |
| Air Gap | | | 0.30 | 80 | |
| Lens 808 | 48.5361 | 62.80131 | 12.50 | 66 | NBPD10 |
| Air Gap | | | 1.30 | 66 | |
| Lens 810 | 42.89693 | 27.46509 | 5.00 | 50 | FKS53 |
| Air Gap | | | 9.24 | 50 | |
| Lens 812 | 125.9718 | 28.81158 | 3.50 | 40 | SF3 |
| Air Gap | | | 29.80 | 40 | |
| Stop 814 | | | | 20.9981 | |
| Air Gap | | | 32.42 | 44 | |
| Lens 816 | −135.9954 | 248.5548 | 6.00 | 44 | LASF62M |
| Air Gap | | | 3.00 | 52 | |
| Lens 818 | 644.3128 | −56.18778 | 11.10 | 52 | FKS53 |
| Air Gap | | | 0.30 | 56 | |
| Lens 820 | 1534.644 | −83.96893 | 10.30 | 56 | FKS53 |
| Air Gap | | | 1.40 | 60 | |
| Lens 822 | 128.5954 | −122.2506 | 10.20 | 60 | FKS53 |

Thus, although there has been disclosed to this point a particular embodiment for a projection lens assembly, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A projection lens assembly comprising:
   an objective lens group, said objective group comprising:
      a first lens at an end of said objective lens group opposite said aperture
      stop, said first lens being a positive lens; and a second lens adjacent to said first lens, said second lens being a positive lens:

a telecentric lens group; and an aperture stop between said objective lens group and said telecentric lens group, said projection lens having an object plane, a BFD:EFL ratio in the range of 0.80:1 to 1.60:1, an air equivalent BFD of at least 4.3 inches, a throw ratio in the range of 3:1 to 6:1, and operating with its chief rays telecentric at said object plane.

2. The projection lens of claim 1, said objective lens group further comprising:

a third lens adjacent to said second lens, said third lens being a negative lens.

3. The projection lens of claim 2, said objective lens group further comprising:

a fourth lens adjacent to said third lens, said fourth lens being a negative lens.

4. The projection lens of claim 1, said telecentric lens group comprising:

a first lens at an end of said telecentric lens group adjacent said aperture stop, said first lens being a negative lens;

a second lens adjacent to said first lens, said second lens being a positive lens;

a third lens adjacent to said second lens, said third lens being a positive lens; and a fourth lens adjacent to said third lens, said fourth lens being a positive lens.

5. The projection lens of claim 4, wherein said first lens and said second form a cemented doublet.

* * * * *